United States Patent [19]
Mikats et al.

[11] Patent Number: 5,716,479
[45] Date of Patent: Feb. 10, 1998

[54] PROCESS AND APPARATUS FOR PRODUCING FIBERGLASS REINFORCED THERMOPLASTIC PANELS

[75] Inventors: Gunther Mikats, Hirm; Günter Erhardt, Trausdorf, both of Austria

[73] Assignee: Isosport Verbundbauteile Gesellschaft m.b.H., Austria

[21] Appl. No.: 525,501

[22] PCT Filed: Jan. 27, 1995

[86] PCT No.: PCT/AT95/00016

§ 371 Date: Sep. 20, 1995

§ 102(e) Date: Sep. 20, 1995

[87] PCT Pub. No.: WO95/20481

PCT Pub. Date: Aug. 3, 1995

[30] Foreign Application Priority Data

Jan. 28, 1994 [AT] Austria ................. A 163/94

[51] Int. Cl.$^6$ .................. B29C 47/02; B29C 70/50
[52] U.S. Cl. ............ 156/244.27; 156/244.12; 156/324; 156/583.5; 264/129; 264/257; 264/258
[58] Field of Search ............... 156/324, 244.12, 156/244.18, 244.19, 244.24, 244.27, 500, 501, 550, 551, 555, 583.5; 264/129, 257, 258

[56] References Cited

U.S. PATENT DOCUMENTS

| | | | |
|---|---|---|---|
| 3,235,437 | 2/1966 | Varlet | 156/551 |
| 3,619,316 | 11/1971 | Ishida | 156/148 |
| 3,765,998 | 10/1973 | Oswald | 156/244.27 |
| 4,086,316 | 4/1978 | Ahrweiler et al. | |
| 4,302,269 | 11/1981 | Steinberg | 156/244.27 |
| 4,613,393 | 9/1986 | Cattanach | 156/323 |
| 4,622,192 | 11/1986 | Ma | |
| 4,844,766 | 7/1989 | Held | 156/324 |
| 5,141,583 | 8/1992 | Hebl | 156/324 |
| 5,565,056 | 10/1996 | Lause | 156/244.27 |

FOREIGN PATENT DOCUMENTS

| | | |
|---|---|---|
| 0322774 | 7/1989 | European Pat. Off. |
| 0 363 794 | 10/1989 | European Pat. Off. |
| 58-003832 | 1/1983 | Japan |

*Primary Examiner*—Daniel Stemmer
*Attorney, Agent, or Firm*—Bacon & Thomas

[57] ABSTRACT

A process and device are disclosed for producing glass fiber mat reinforced thermoplastic boards, as well as their advantageous use. Glass fiber mats are impregnated with molten thermoplastics and the composite glass fiber mat is then pressed. At least one of the glass fiber mats runs through the aperture of an impregnation nozzle controllably supplied with molten thermoplastics by extruders, forming two streams of molten mass that are applied at the outlet of the nozzle aperture on the top and on the bottom of the glass mats, pre-impregnating the glass fiber mat. These glass fiber mats thus pre-impregnated with thermoplastics runs through a gap between feeding rollers of a double belt press, are pre-calibrated then pressed by cooling plates into glass fiber mat reinforced thermoplastic board.

6 Claims, 3 Drawing Sheets

PROCESS AND APPARATUS FOR PRODUCING FIBERGLASS REINFORCED THERMOPLASTIC PANELS

BACKGROUND OF THE INVENTION

1. Field of the Invention

The invention concerns a method for manufacturing fiberglass-reinforced thermoplastic panels, their advantageous applications and also equipment with which to implement this method.

2. Description of the Prior Art

The manufacture of fiberglass reinforced thermoplastic panels using a homogeneous melt of the thermoplastic in an extruder is known, in which the melt is forced out through a die to flow between parallel-running fiberglass mats. Next these fiberglass mats are impregnated at raised pressure and higher temperature with the thermoplastic melt and the composite so formed is then cooled under pressure.

This procedure suffers from the drawback that the thermoplastic melt is deposited only on one side of the fiberglass mat. As a result, high pressures and high temperatures must be applied to ensure uniform impregnation of the mats. In turn, however, high pressures require bulky, energy-consuming presses which are difficult to handle.

SUMMARY OF THE INVENTION

The object of the invention is to create an easily implemented, energy-conserving method for the manufacture of fiberglass-reinforced thermoplastic panels simultaneously allowing uniform impregnation of the fiberglass mat(s) being used.

Accordingly the invention proposes a method in which at least one fiberglass mat (10, 11) is made to pass through the aperture (3', 4') of an impregnation nozzle (3, 4) which is fed in controlled manner with the thermoplastic melt (26, 28) from the extruders (1, 2) such that two streams of melt (26', 26" and 28', 28") are formed and deposited at the outlet of the nozzle aperture (27, 27') onto the top and bottom sides of the glass mat (10, 11), the impregnation of the fiberglass mat taking place in the process. Thereafter, the fiberglass mat (30, 30') impregnated with the thermoplastic is guided into a gap (18) between entry rollers of a double belt press (5) and is calibrated, finally being compressed by means of the cooling plates (22, 22') into the fiberglass-reinforced thermoplastic panels (25).

The invention also proposes simultaneously passing two fiberglass mats (10, 11) through the apertures (3', 4') of the impregnating nozzles (3, 4) which are fed in controlled manner with the thermoplastic melts (26, 28) from the extruders (1, 2), such that two flows of melt (26', 26" and 28', 28") are formed and deposited at the outlet of the nozzle aperture (27, 27') onto the top and bottom sides of the glass mats (10, 11) with simultaneous impregnation of the fiberglass mats. Thereafter, the glass mats (30, 30'), impregnated with thermoplastic, are made to pass into the gap (18) between entry rollers of the double belt press (5) and are calibrated, and then are compressed by means of the cooling plates (22, 22') into the fiberglass-reinforced thermoplastic panels (25).

Advantageously the fiberglass mats (10, 11) are preheated in the nozzle aperture (3', 4').

A low-viscosity polypropylene melt, which may contain additives such as peroxides, is advantageously used as the impregnation thermoplastic melt (26, 28).

The invention offers another advantage, wherein the flow of melt (26', 26" and 28', 28") is controlled by means of melt-control valves (29, 29') present in the distribution unit (8, 9).

Advantageously the fiberglass mat is composed of cut, tangled and/or unidirectional and/or directional uncut glass fibers with a surface content of 450 to 1,300 $g/m^2$.

In another advantageous embodiment of the method of the invention, the impregnated fiberglass mats 30, 30' are calibrated in the cross-sectionally adjustable gap 18 between the entry rollers. Thereafter, the compound of thermoplastic and fiberglass mats so formed is compressed at a maximum pressure of 2 bars in the compression zone.

Advantageously the fiberglass-reinforced thermoplastic panels manufactured in the manner of the invention are used as molded parts, for instance automotive parts.

The equipment with which to implement the method of the invention is composed of the extruders (1, 2), the control units (8, 9) controlling the flow (26, 28) of the thermoplastic melt, the impregnation nozzles (3, 4) each comprising two nozzle slots (31, 31' and 32, 32'), the nozzle apertures (3', 4') feeding the fiberglass mats between every two nozzle slots, and double belt press (5) with cooling plates mounted (22, 22') in the cooling zone.

Apertures (3', 4') are designed so that they taper conically toward the outlet of the nozzle apertures (27, 27'), that is, the die cross-section is wider at the aperture inlet (3', 4') than at the aperture outlet (27, 27').

The cooling plates (22, 22') advantageously simultaneously operate as compression plates, being unilaterally fitted with glide foils (23, 23') at the contact surface with the steel belts (16, 17).

Advantageously control units (8, 9) are fitted with melt-control valves (29, 29') to control the flow (26, 28) of thermoplastic melt.

Also advantageously, the equipment comprises lateral endless guide belts (35, 35') in the double belt press (5), the thickness of the belts corresponding to that of the composite (36).

The equipment of the invention is furthermore characterized in that the cross-section of the entry roller gap (18) formed by the heated entry rollers (12, 13) is adjustable.

BRIEF DESCRIPTION OF THE FIGURES OF DRAWING

The method of the invention is illustrated in FIGS. 1–3.

FIG. 1 shows extruders 1, 2, impregnation nozzles 3, 4 and double belt press 5.

FIG. 2 shows the portion of FIG. 1 relating to the extruder units 1 and 2, control units 8 and 9 with melt-control valves 29, 29' and impregnating nozzles 3, 4.

FIG. 3 shows the portion of FIG. 1 relating to the impregnation nozzles 3, 4 and entry rollers 12, 13 of the double belt press.

DETAILED DESCRIPTION OF THE PREFERRED EMBODIMENT

Figure 1:
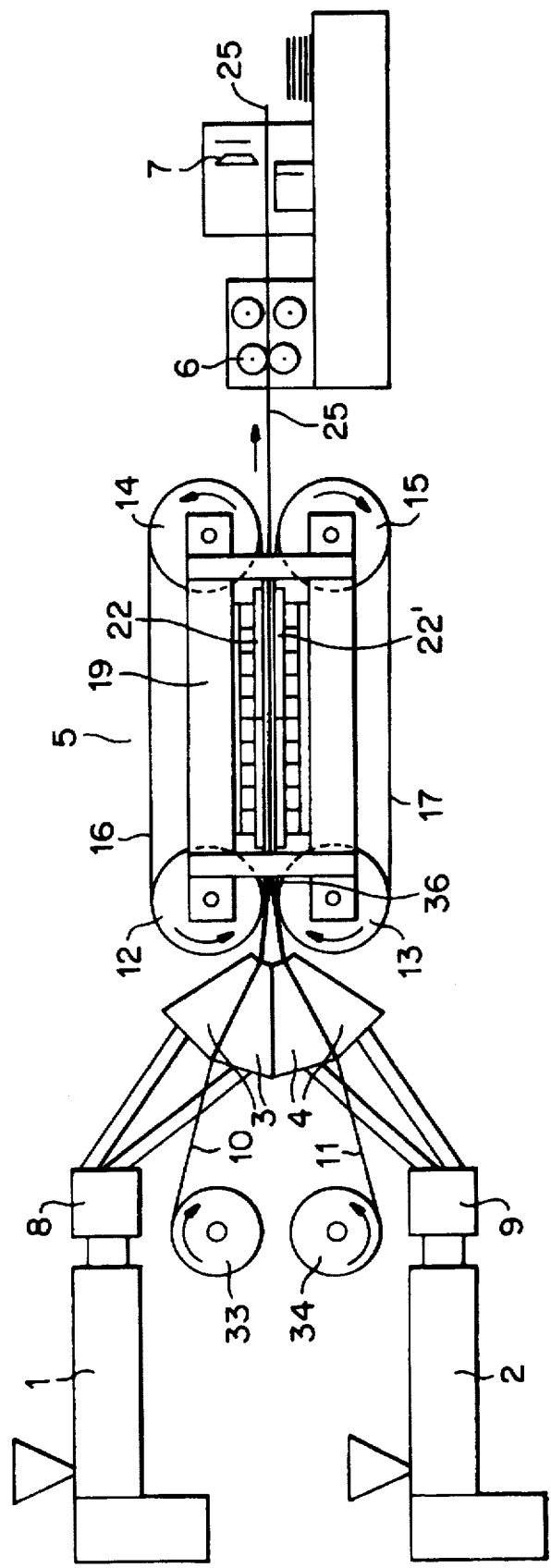
Figure 2:
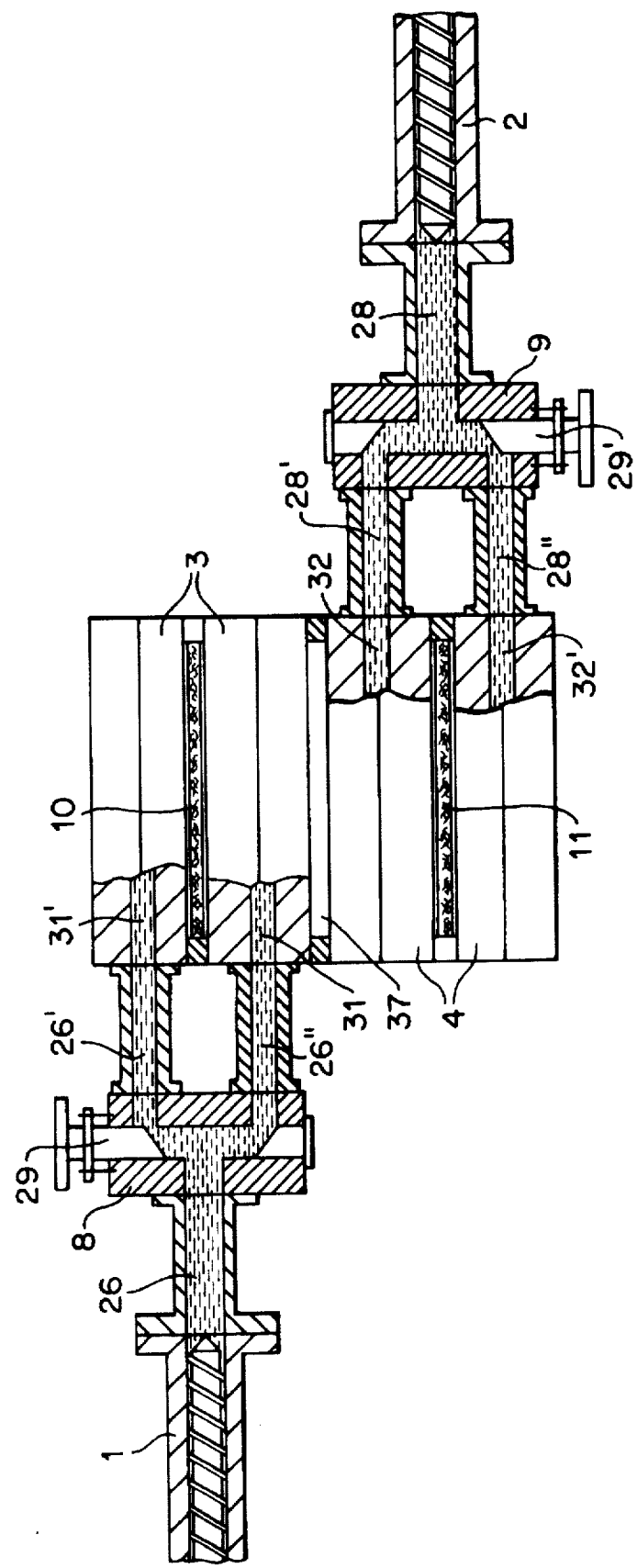
Figure 3:
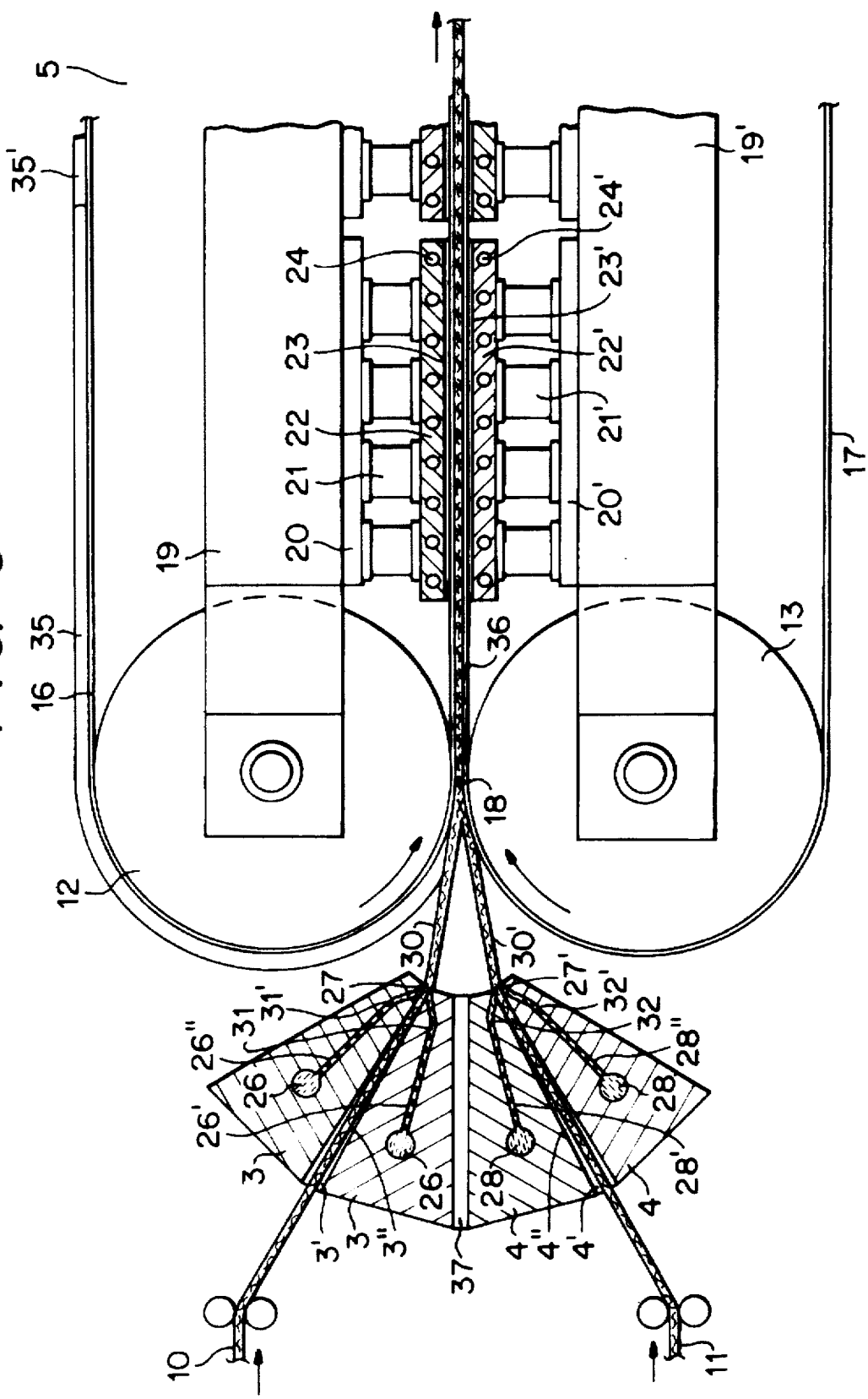

The method of the invention is carried out as follows: A thermoplastic such as polypropylene, possibly mixed with additives, for example peroxides, is fed into the extruders 1, 2. These extruders 1, 2 are heated to at least the melting point of the thermoplastic which then is supplied in the form of thermoplastic melts 26 and 28 to the control units 8 and 9. The flow of melt can be controlled in the control unit 8, 9 by means of melt-control valve 29, 29'. The flows of melt 26', 26" and 28', 28" are fed to slots 31, 31' of impregnation nozzle 3 and to slots 32 and 32' of impregnation nozzle 4. Impregnation nozzles 3, 4 are heated at least to the melting point of the thermoplastic.

Fiberglass mats 10, 11 are supplied from storage rollers 33, 34 to impregnation nozzles 3, 4. These fiberglass mats illustratively may be needled, tangled fiber mats with surface content of 450 to 1,300 g/m².

Fiberglass mats 10, 11 are fed so that they pass through preheated nozzle apertures 3', 4'. Nozzle apertures 3', 4' are designed to taper conically toward nozzle exit 27, 27'. Accordingly the nozzle aperture cross-section is wider at inlet 3", 4" than at the nozzle aperture outlet 27, 27'. The flows of thermoplastic melt 26', 26" and 28', 28" are deposited at the top and bottom sides of fiberglass mats 10, 11, as a result of which the fiberglass mat impregnation takes place at the outlet of the nozzle aperture 27, 27'. This step ensures uniform impregnation of the fiberglass mats. The extent of impregnation is adjusted by the control units 8, 9. In this manner, the properties of the fiberglass-reinforced thermoplastic panel 25, for example, the surface properties, may be substantially controlled.

Bilaterally impregnated fiberglass mats are guided into the entry roller gap 18 of double-belt press 5. Press 5 is composed of a pair of heated intake rollers 12, 13 and a pair of exit rollers 14, 15, endless steel belt 16, 17 being tensioned around rollers 12, 14 and rollers 13, 15. The cross-section of gap 18 between the entry rollers is adjustable and thereby calibration of the impregnated fiberglass mat 30, 30' takes place. Due to the compression exerted by the rollers 12, 13, a thermoplastic composite 36 composed of the fiberglass mats is formed. This compound is fed to cooling plates 22, 22' which dissipate heat from the composite 36. Boreholes 24, 24' crossed by a cooling medium such as water are arranged in such a way that the direction of flow in the mutually opposite plates 24 and 24' are opposite. As a result, the intrinsic stresses in the thermoplastic—which as a rule arise during extrusion—are relieved. Moreover cooling plates 22, 22' are used as compressive plates and consequently are fitted with the gliding foils 23, 23' at the sides facing the endless steel belts 16, 17. The cooling plates are affixed to the frame of the double-belt press 5 by compression cylinders 21, 21' and as a result they are forced bilaterally against the composite 36. To preclude the thermoplastic melt from leaking out of the compression zone, guide belts 35, 35' approximately the same size as the thickness of the composite 36 are moved along in endless manner on the sides of the double-belt press 5.

The design step of cooling plates 22, 22' assures heat dissipation from the thermoplastic and consequently the method of the invention can be carried out in energy-conserving manner. Moreover the compression exerted by the cooling plates may be minimized, for instance at 1 bar, to achieve adequate compression into the final fiberglass-reinforced thermoplastic panels 25. This feature is attributed to adequate impregnation already taking place at the outlet of the nozzle aperture 27, 27' of the impregnation nozzles 3, 4, whereby compression is not needed for impregnation but to form the thermoplastic compound, i.e. the final panel 25. After they pass through the pair of exit rollers 14, 15, the cooled thermoplastic panels 25 are fed to a system of circular knives 6 which cut their lateral edges. The panels 25 are then cut to appropriate length by guillotine shears 7.

Fiberglass-reinforced thermoplastic panels manufactured by the method of the invention may be between 1 and 5 mm thick; their glass content being between 20 and 50%.

When manufacturing fiberglass-reinforced thermoplastic panels with high glass contents, for instance 50% and more than 5 mm thick, a third glass mat may be fed into the gap 37 between the two impregnation nozzles 3 and 4 in order to raise the proportion of glass fibers.

When manufacturing fiberglass-reinforced thermoplastic panels less than 2.5 mm thick, with a glass content less than 40%, only one of the glass mats 10 and 11 is used in the method of the invention.

The fiberglass-reinforced thermoplastic panels manufactured by the method of the invention may be used in making molded parts such automobile parts and using extruders or molding presses. In the method of the invention, the fiberglass-reinforced thermoplastic panels are heated to their melting point, laid into a mold and are compressed into a molded part.

We claim:

1. A method of manufacturing fiberglass-reinforced thermoplastic panels comprising passing at least one fiberglass mat through an aperture of an impregnation nozzle, feeding molten thermoplastic material to said impregnation nozzle in two streams, depositing the molten thermoplastic material from each stream on the top and bottom sides of the glass mat at the outlet of the nozzle such that said mat is impregnated with said molten thermoplastic material at the outlet of the nozzle, passing said impregnated mat into a gap between entry rollers of a double-belt press to calibrate the impregnated mat and compressing the calibrated, impregnated mat under a pressure up to 2 bars by means of cooling plates to produce a fiberglass-reinforced thermoplastic panel.

2. A method of manufacturing fiberglass-reinforced thermoplastic panels comprising simultaneously passing two fiberglass mats through separate nozzle apertures of two impregnation nozzles, feeding molten thermoplastic material to each said impregnation nozzle in two streams, depositing the molten thermoplastic material from said two streams in each impregnation nozzle on the top and bottom sides of the glass mat passing through said nozzle aperture at the outlet of said nozzle such that each mat is impregnated with the molten thermoplastic material at the outlet of each nozzle, passing said impregnated mats into a gap between entry rollers of a double belt press to calibrate the impregnated mats and compressing the calibrated, impregnated mats between cooling plates at a pressure up to 2 bars to produce a fiberglass-reinforced thermoplastic panel.

3. The method of claim 1 or 2, further comprising heating said fiberglass mat prior to depositing the molten thermoplastic material.

4. The method of claim 1 or 2, wherein the molten thermoplastic material is a low viscosity melt of polypropylene.

5. The method of claim 4, wherein said polypropylene contains one or more peroxides as an additive.

6. The method of claim 1 or 2, wherein said fiberglass mat is comprised of glass fibers with a surface content of 450 to 1,300 g/m².

* * * * *